(12) United States Patent
Aas et al.

(10) Patent No.: US 11,619,829 B2
(45) Date of Patent: Apr. 4, 2023

(54) LINE PATTERN PROJECTIONS FOR THREE DIMENSION DISPLAY

(71) Applicant: Lumileds LLC, San Jose, CA (US)

(72) Inventors: Mehdi Aas, Eindhoven (NL); Rob Jacques Paul Engelen, Eindhoven (NL)

(73) Assignee: Lumileds LLC, San Jose, CA (US)

(*) Notice: Subject to any disclaimer, the term of this patent is extended or adjusted under 35 U.S.C. 154(b) by 195 days.

(21) Appl. No.: 17/117,301

(22) Filed: Dec. 10, 2020

(65) Prior Publication Data
US 2022/0187612 A1    Jun. 16, 2022

(51) Int. Cl.
*G02B 30/30* (2020.01)
*H04N 13/122* (2018.01)
*H04N 13/344* (2018.01)
*G02B 27/09* (2006.01)

(52) U.S. Cl.
CPC ........... *G02B 30/30* (2020.01); *H04N 13/122* (2018.05); *H04N 13/344* (2018.05); *G02B 27/0944* (2013.01)

(58) Field of Classification Search
CPC .. H04N 13/128; H04N 13/122; H04N 13/125; H04N 13/00; H04N 13/349; H04N 13/225; H04N 13/32; H04N 13/317; H04N 13/31; H04N 13/0081; H04N 13/302; H04N 13/315; H04N 13/312; H04N 13/293; H04N 2213/002; H04N 13/344; G02B 30/30; G02B 30/20; G02B 30/31; G02B 30/32; G02B 30/26; G02B 30/34; G02B 2027/0134; G02B 27/0944
See application file for complete search history.

(56) References Cited

U.S. PATENT DOCUMENTS

| 8,953,241 | B2 | 2/2015 | Song |
| 9,372,349 | B2 | 6/2016 | Brug et al. |
| 2011/0159929 | A1* | 6/2011 | Karaoguz ............ H04N 13/315 715/764 |

(Continued)

FOREIGN PATENT DOCUMENTS

CN    103235415 A    8/2013

OTHER PUBLICATIONS

Wikipedia, "Parallax barrier", published Dec. 10, 2020; 8 pages.

*Primary Examiner* — Xuemei Zheng
(74) *Attorney, Agent, or Firm* — Schwegman, Lundberg & Woessner, P.A.

(57) ABSTRACT

An autostereoscopic 3D display assembly includes pixels configured to generate a first image intended for a user's left eye, and a second image intended for a user's right eye. Each of the images is projected with a respective line pattern, where the bright portions of the left eye line pattern alternate with the bright portions of the right eye line pattern. The left eye and right eye line patterns are formed using a grating or a double grating. In one embodiment, right eye pixels and left eye pixels each include a double grating, with a different offset between the first grating and second grating to generate the different line patterns. In another embodiment, right eye pixels and left eye pixels each include a grating and one or more micro-LEDs, with a different offset between the grating and the micro-LEDs to generate the different line patterns.

18 Claims, 7 Drawing Sheets

(56) References Cited

U.S. PATENT DOCUMENTS

| | | |
|---|---|---|
| 2013/0335538 A1 | 12/2013 | Shestak et al. |
| 2014/0085442 A1* | 3/2014 | Ono .................... H04N 13/337 348/54 |
| 2016/0094838 A1* | 3/2016 | Koito .................... H04N 13/31 348/54 |
| 2016/0187679 A1* | 6/2016 | Lin .................... G02F 1/13475 349/33 |
| 2017/0176759 A1 | 6/2017 | Wei |
| 2019/0384141 A1 | 12/2019 | Engelen et al. |
| 2021/0223568 A1* | 7/2021 | Makinen ................ H04N 13/31 |

\* cited by examiner

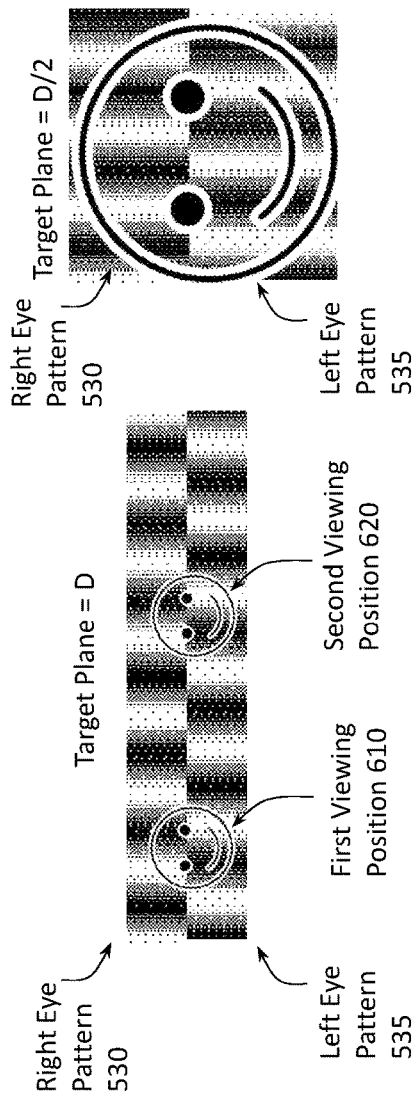
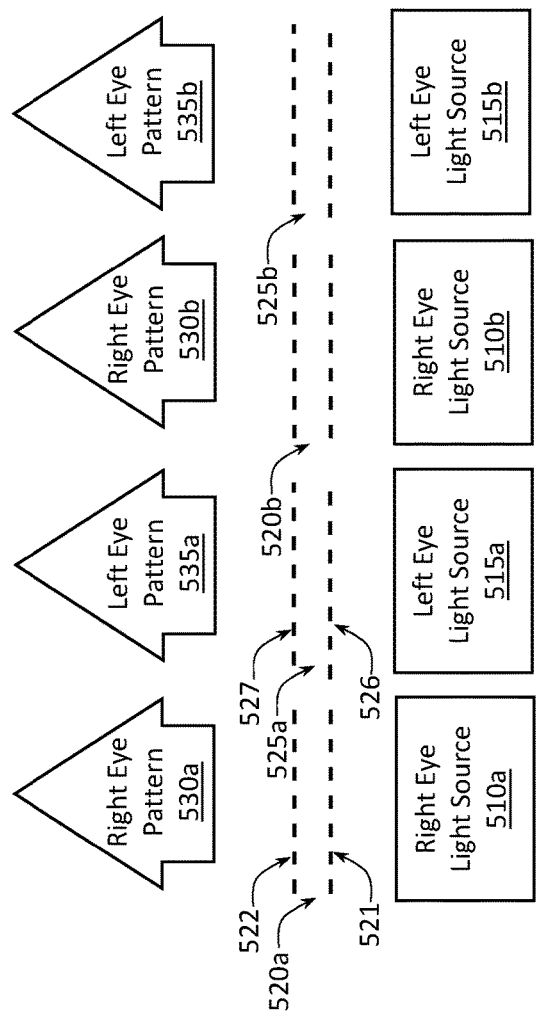
FIG. 6A
FIG. 6B
FIG. 5
FIG. 7

US 11,619,829 B2

LINE PATTERN PROJECTIONS FOR THREE DIMENSION DISPLAY

TECHNICAL FIELD OF THE DISCLOSURE

The present disclosure relates generally to a three-dimensional display and, more specifically, to a three-dimensional display that uses line pattern projections to generate left eye and right eye images.

BACKGROUND

Three-dimensional (3D) perception in human vision is based on the parallax effect attributed to the vision from two eyes at 50 mm-70 mm distance apart from each other. 3D display technologies enable viewers to perceive a 3D image by projecting double images with a proper parallax to the right and left eyes. There are several existing methods to realize this concept. In older techniques, the overlap of two images are displayed on a screen simultaneously, and the right and left images are isolated on the eyes location using glasses or goggles. 3D glasses or goggles may isolate the left and right images using color filtering, polarization filtering, time sequential filtering, or other mechanisms. In more recent techniques, the left-right images are projected separately on the bare eyes, so that glasses or goggles are not required. Such bare eye 3D displays are called autostereoscopic displays. Isolated image projection on bare eyes can be achieved through spatial-angular isolation of separate beams propagated to the left eyes and right eyes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 provides an illustration of four pixel assemblies of a double grating display assembly, according to some embodiments of the present disclosure;

FIGS. 6A and 6B provide light intensity fields projected onto users' eyes of the double grating pixel assemblies of FIG. 5;

FIG. 7 illustrates a cross section of the double gratings shown in FIG. 5, according to some embodiments of the present disclosure;

DESCRIPTION OF EXAMPLE EMBODIMENTS OF THE DISCLOSURE

Overview

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

For purposes of illustrating the display assemblies described herein, it might be useful to understand phenomena that may come into play in 3D displays. The following foundational information may be viewed as a basis from which the present disclosure may be properly explained. Such information is offered for purposes of explanation only and, accordingly, should not be construed in any way to limit the broad scope of the present disclosure and its potential applications.

In one previous implementation of a bare-eye 3D display, the left and right images are each projected to exact locations for a user's two eyes, and the user's eyes must be aligned precisely in front of the display to see the 3D effect. This type of system can only work with a single user. In order to build a multiple viewpoint 3D display, a display device may generate a sequence of right images and left images, each focused at a different angular position corresponding to a different user's eye. Such display devices typically have a set number of fixed viewing positions, and often sacrifice resolution as the number of viewpoints supported is increased. Current implementations of multi-viewpoint 3D displays use lenses to focus the light to the locations of users' eyes.

Figure 1:
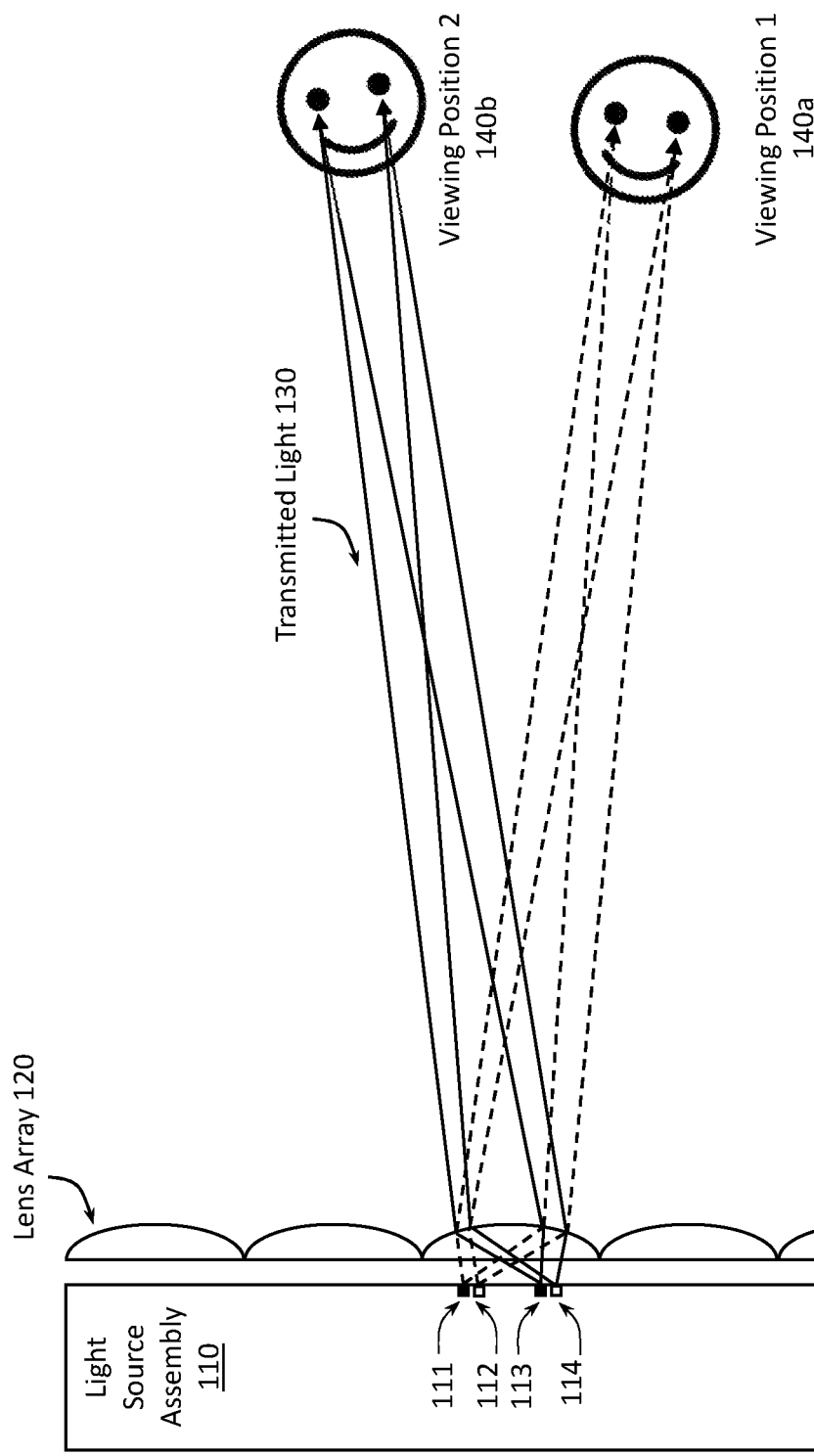
FIG. 1 provides a prior art example of a display assembly configured to project left and right images to users' left and right eyes.

FIG. 1 shows an example implementation of a prior art display assembly configured to project left and right images to the left and right eyes of multiple users. In this example, the display assembly is configured to project images to two viewing positions 140*a* and 140*b*. The display assembly includes a light source assembly 110, which includes four example pixels 111, 112, 113, and 114. The pixels 111-114 may be red-green-blue (RGB) pixels that include light emitting diodes (LEDs) or another type of light source. Pixel 111 is part of a set of pixels that generates an image for the right eye at viewing position 1 140*a*, and pixel 112 is part of a set of pixels that generates an image for the left eye at viewing position 1 140*a*. Pixels 113 and 114 are each part of a respective set of pixels that generates images for the left and right eyes and viewing position 2 140*b*. Each set of pixels are spread across the light source assembly 110, e.g., the pixels alternate between right eye pixels and left eye pixels for various viewing positions across the width of the light source assembly 110.

The display assembly includes a cylindrical lens array 120 on top of the light source assembly 110. The cylindrical lenses focus the light emitted by the pixels, e.g., pixels 111-114, at particular viewing positions. FIG. 1 depicts several example beams of transmitted light 130 that travel from the pixels 111-114, through the lens array 120, and to users' eyes at two viewing positions 140a and 140b. The lens array 120 may be separated from the light source assembly 110 by a focal distance.

Achieving proper projection of the right and left images to the users' left and right eyes depends on precise alignment of the lens array 120 relative to the pixels in the light source assembly 110. Achieving the alignment needed can be challenging due to the different tolerances during the assembly of the display device and thermal effects on the display device. Furthermore, as the display size and viewing range increase, the size of the optics scales up, and the sensitivity to optical misalignments increases correspondingly.

Embodiments of the present disclosure provide display assemblies that include a grating or pair of gratings to project line patterns for 3D viewing. The display assembly includes one set of pixels for generating right eye images and another set of pixels for generating left eye images. Each of the pixels includes a respective grating or set of gratings that are arranged to produce a line pattern. Each line pattern has alternating "bright" portions that are visible to a user's eye, and "dark" portions that are not visible to the eye. As used herein, "bright" portions of a line pattern have an intensity above a threshold, and "dark" portions of a line pattern have an intensity below a threshold. For example, the bright portions have an intensity above 50% of a maximum intensity across the line pattern, and the dark portions have an intensity below 50% of the maximum intensity across the line pattern. As another example, bright portions have an intensity above 75% of a maximum intensity across the line pattern, and dark portions have an intensity below 25% of a maximum intensity across the line pattern; in this example, the bright and dark portions are separated by medium-intensity portions.

To generate 3D images, gratings for the right eye pixels and the gratings for the left eye pixels are offset relative to each other, producing right eye and left eye line patterns that are also offset relative to each other. More particularly, the bright and dark portions of the right and left eye line patterns are offset from each other, so that at a particular eye position, the left eye image is visible and the right eye image is not visible, or vice versa. If a user's eyes are positioned so that the user's right eye receives a bright portion of the right eye line pattern (e.g., at or near a maxima of the right eye line pattern) and the users' left eye receives a bright portion of the left eye line pattern (e.g., at or near a maxima of the left eye line pattern), the user can perceive the 3D image.

In one example implementation, the pixels each include a double grating, i.e., one grating separated from a second grating. Each grating includes alternating light blocking sections and light transmitting sections. A light source emits light in the direction of the double grating assembly. A first portion of the light emitted from the light source passes through the first grating, and a second portion of the light passed through the first grating passes through the second grating. The first and second gratings each have a respective pitch, which is consistent across each grating. As used herein, the "pitch" of a grating is the sum of the width of one light blocking section and one light transmitting section of the grating, i.e., the distance from a position on a light blocking section to the same position on a subsequent light blocking section. The gratings are periodic, and the pitch may also be referred to as the period of the grating. A "phase shift" between the first grating and the second grating describes an offset between the positions of the light blocking sections and the light transmitting sections of the respective gratings. To generate the right eye and left eye line patterns, the phase shift between the first and second gratings of the right eye pixels is different from the phase shift between the first and second gratings of the left eye pixels. For example, the relative phase shifts differ by about half of the pitch of the gratings.

In another example implementation, the light source and first grating are replaced by one or more micro-LEDs, which act as point sources. Each pixel includes a single grating and one or more micro-LEDs. The gratings are positioned relative to the micro-LED, or a series of micro-LEDs, in each pixel to produce a particular line pattern. The position of the grating relative to the micro-LEDs in the left eye pixels are offset relative to the position of the grating relative to the micro-LEDs in the right eye pixels in a similar manner as the second gratings in the double grating example, i.e., with a relative phase shift that may be about one-half of the pitch of the gratings.

In still another example implementation, each pixel includes one or more right eye micro-LEDs and one or more left eye micro-LEDs, which are offset relative to each other. For example, a pixel includes a row of alternating right eye and left eye micro-LEDs, and a single grating positioned over the row of micro-LEDs. Each pixel produces both the left eye line pattern and right eye line pattern simultaneously, which improves display resolution.

Unlike prior 3D displays where the user can be located at only one fixed position relative to the display, or at one of a small number of fixed positions, with the grating-based display assembly, any position in which the user's right eye is aligned with the right eye image and the user's left eye is aligned with the left eye image enables the user to perceive the 3D image. Because the line patterns repeat across the viewing area, this increases flexibility in user positioning relative to the display. Further, the display assembly can be viewed by multiple viewers simultaneously without sacrificing resolution. Additional advantages of the grating-based 3D display are described further below.

In one embodiment, a display assembly includes a first plurality of pixels to generate a first image pattern for a left eye and a second plurality of pixels to generate a second image pattern for a right eye. Each of the first plurality of pixels includes a first left eye grating having alternating light blocking sections and light transmitting sections; a second left eye grating having alternating light blocking sections and light transmitting sections, the second left eye grating having a first phase shift relative to the first left eye grating; and a left eye light source to emit light directed at the first left eye grating and the second left eye grating to generate the first image pattern. Each of the second plurality of pixels includes a first right eye grating having alternating light blocking sections and light transmitting sections; a second right eye grating having alternating light blocking sections and light transmitting sections, the second right eye grating having a second phase shift relative to the first right eye grating, the second phase shift different from the first phase shift; and a right eye light source to emit light directed at the first right eye grating and the second right eye grating to generate the second image pattern.

In another embodiment, a display assembly includes a first plurality of pixels to generate a first image pattern for a left eye and a second plurality of pixels to generate a second image pattern for a right eye. Each of the first plurality of pixels includes a left eye grating having alternating light blocking sections and light transmitting sections and at least one left eye micro-LED positioned to emit light directed at the left eye grating to generate the first image pattern, the at least one left eye micro-LED having a first phase shift relative to the left eye grating. Each of the second plurality of pixels includes a right eye grating comprising alternating light blocking sections and light transmitting sections and at least one right eye micro-LED positioned to emit light directed at the right eye grating to generate the second image pattern, the at least one right eye micro-LED having a second phase shift relative to the right eye grating, the second phase shift different from the first phase shift.

In still another embodiment, a display assembly includes a plurality of pixels, each pixel including a grating having alternating light blocking sections and light transmitting sections arranged at a pitch; at least one first micro light emitting diode (micro-LEDs) arranged to emit light directed at the grating to generate a first image pattern, the at least one first micro-LED having a first position relative to the pitch of the grating; and at least one second micro-LED arranged to emit light directed at the grating to generate a second image pattern, the at least one second micro-LED having a second position relative to the pitch of the grating, the second position shifted relative to the first position.

As will be appreciated by one skilled in the art, aspects of the present disclosure, in particular aspects of a line pattern projected 3D display, described herein, may be embodied in various manners—e.g. as a method, a system, a computer program product, or a computer readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing measurement systems or their controllers) or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Double Grating

Figure 2:
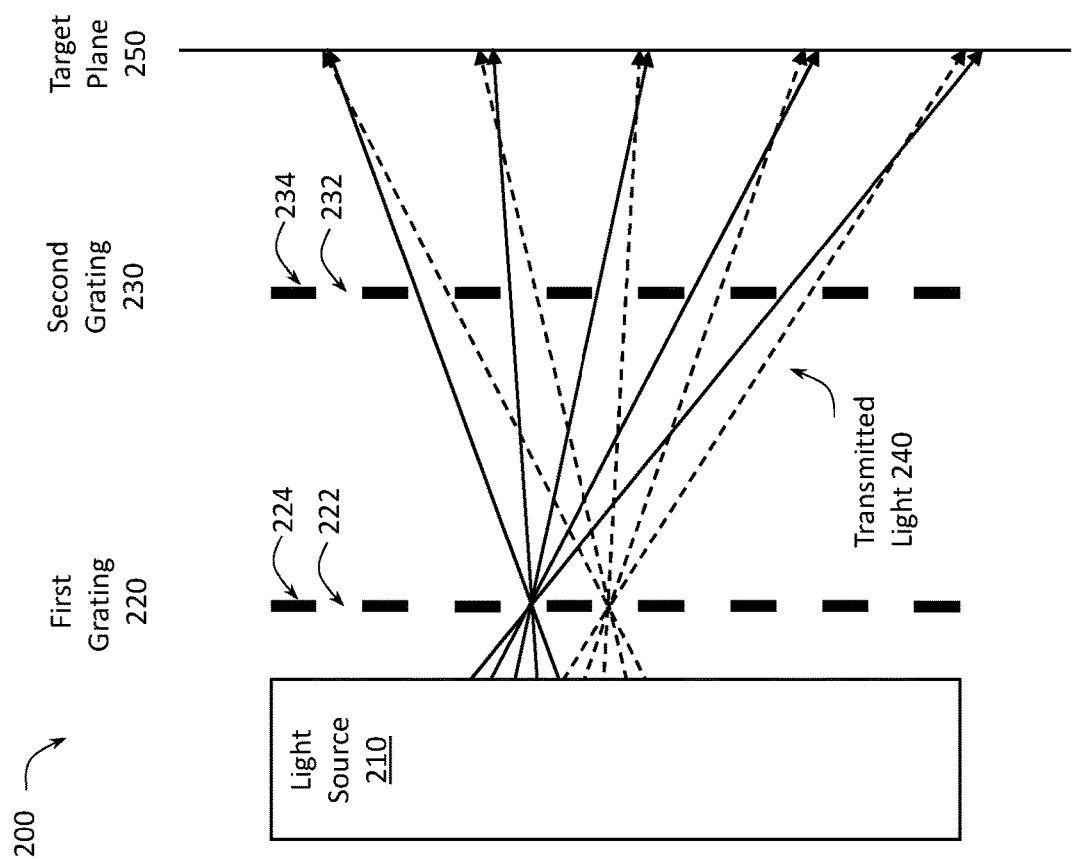
FIG. 2 provides a cross section of transmitted light passed through a double grating according to some embodiments of the present disclosure.

FIG. 2 provides a cross section of transmitted light passed through a double grating according to some embodiments of the present disclosure. A light source 210 emits light in the general direction of a double grating that includes a first grating 220 and second grating 230; the light 240 that is transmitted through the double grating is generally directed towards a target plane 250. The light source 210 may include LEDs, micro-LEDs, organic LEDs (OLEDs), an electroluminescent panel, a fluorescent lamp, etc. The light source 210 emits light rays at multiple angles and from multiple positions, as shown in FIG. 2. For example, the light source 210 may be a collection of LEDs, each of which emits light rays at multiple angles.

The first grating 220 has a series of alternating light transmitting sections, e.g., light transmitting section 222, and light blocking sections, e.g., light blocking section 224. The light transmitting sections and the light blocking sections are arranged at a first pitch. The second grating 230 is identical to the first grating 220, having a sequence of light transmitting sections (e.g., light transmitting section 232) and light blocking sections (e.g., light blocking section 234) arranged at the same pitch as the first grating 220. The second grating 230 is spaced some distance away from the first grating 220, e.g., 1 mm away from the first grating 220. In this example, the light transmitting sections and light blocking sections of the first grating 220 and the second grating 230 are aligned, such that light emitted perpendicular (or nearly perpendicular) to the gratings is transmitted straight through a light transmitting section of the first grating 220 and a corresponding light transmitting section of the second grating 230. Light emitted at an angle not perpendicular to the gratings may pass through one light transmitting section of the first grating 220 and an offset light transmitting section of the second grating 230.

FIG. 2 shows several example light paths of light that passes through two adjacent light transmitting sections of the first grating 220 and passes through a light transmitting section of the second grating 230. At a target plane 250, the transmitted light 240 that passes through both the first grating 220 and the second grating 230 is grouped into bright lines, forming the line pattern shown in FIG. 3. It should be understood that additional light rays at additional angles, including light rays passing through other transmitting sections of the first grating 220, may pass through the double grating to the target plane 250, or it may be blocked by a light blocking portion.

Figure 3:
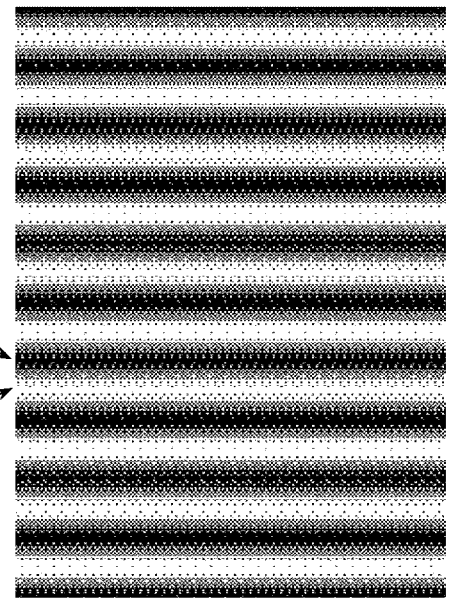
FIG. 3 provides a light intensity field at a target plane of the double grating display assembly of FIG. 2.

FIG. 3 provides a light intensity field at the target plane 250 of the double grating shown in FIG. 2. The light intensity field has alternating bright portions 310 and dark portions 320. The bright portions 310 and dark portions 320 are oriented vertically as depicted in FIG. 3, and the first grating 220 and second grating 230, shown in cross-section in FIG. 2, are also oriented to so that their light transmitting sections and light blocking sections form vertical stripes. The light intensity field shown in FIG. 3 may be shifted to the left or right by shifting the second grating 230 relative to the first grating 220 to the left or right in the frame of FIG. 3 (i.e., shifting the second grating 230 up or down in the frame of FIG. 2).

The distance between consecutive bright portions 310 and consecutive dark portions 320 increases farther from the light source 210, first grating 220, and second grating 230. For example, the light transmitted through consecutive transmitting sections of the second grating 230 may extend at an angle of 1° relative to each other. At a given target plane 250, this may result in consecutive bright portions 310 being 5 cm apart, while at a more distance target plane, the consecutive bright portions 310 are 10 cm apart.

Example Single Grating and Micro-LED Assembly

Figure 4:
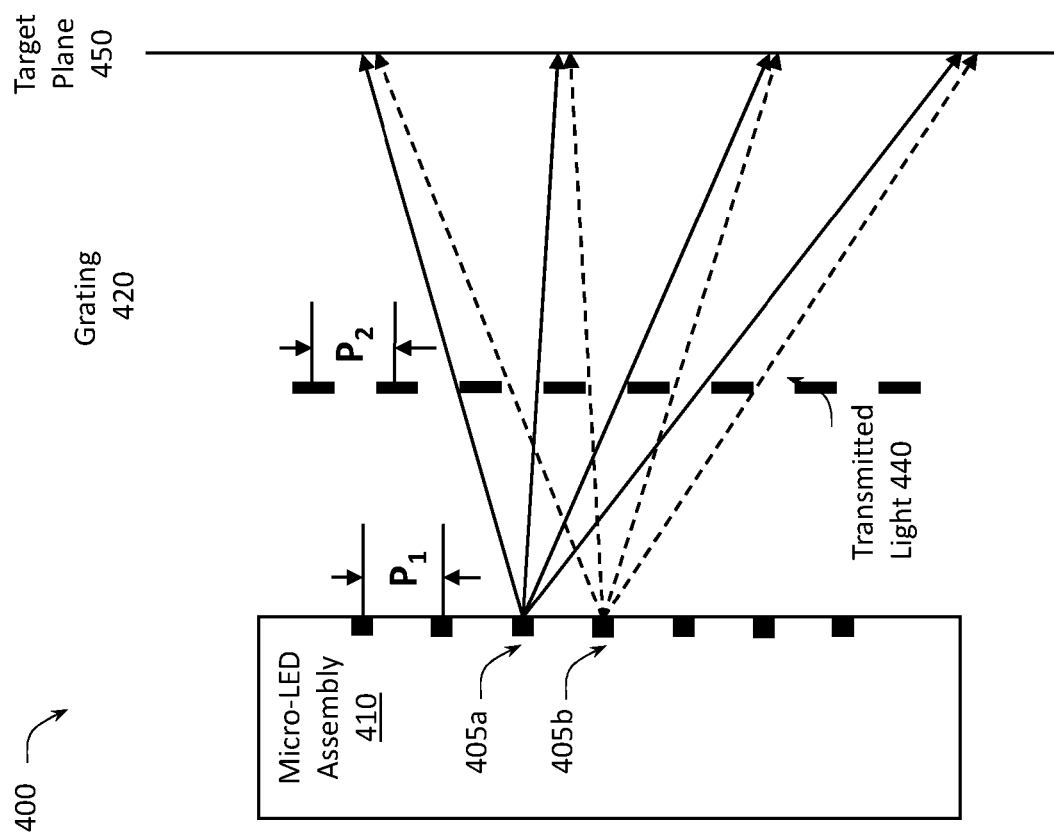
FIG. 4 provides a cross section of light transmitted from micro-LED light sources through a single grating, according to some embodiments of the present disclosure.

FIG. 4 provides a cross section of light transmitted from micro-LED light sources through a single grating, according to some embodiments of the present disclosure. A micro-LED assembly 410 includes several micro-LEDs 405, e.g., micro-LEDs 405a and 405b. The micro-LEDs 405 are regularly spaced at a pitch $P_1$. Each micro-LED 405 emits light in the general direction of a grating 420; the light 440 that is transmitted through the grating 420 reaches a target plane 450. Each micro-LED 405 emits light rays at multiple angles.

The grating 420 is similar to the first and second gratings 220 and 230 shown in FIG. 2, and the grating 420 has a series of alternating light transmitting sections and light blocking sections. The light transmitting sections and the light blocking sections are arranged at a pitch $P_2$. The pitch $P_1$ of the micro-LEDs 405 matches the pitch $P_2$ of the grating 420. In this example, the light transmitting sections of the grating 420 are aligned with the micro-LEDs 405, so that light emitted perpendicular (or nearly perpendicular) to the grating 420 is transmitted straight through a light transmitting section of the grating 420. Light emitted at an angle not perpendicular to the gratings may pass through an offset light transmitting section of the grating 420, or it may be blocked by a light blocking portion.

FIG. 4 shows several example light paths of light that is emitted from the micro-LEDs 405a and 405b and passes through the grating 420. At a target plane 450, the transmitted light 440 that passes through the grating 420 is grouped into bright lines, forming a line pattern having alternating bright portions and dark portions, e.g., the line pattern that was shown in FIG. 3. It should be understood that additional light rays at additional angles, including light rays emitted by other micro-LEDs, may pass through the grating 420 to the target plane 450. The light intensity field generated by the micro-LED assembly 410 and grating 420 may be shifted to the left or right (in the orientation shown in FIG. 3) by shifting the grating 420 relative to the micro-LEDs 405 to the left or right in the frame of FIG. 3, i.e., by shifting the grating 420 up or down in the frame of FIG. 4. As described with respect to FIG. 3, the distance between consecutive bright portions and consecutive dark portions of the line pattern increases farther from the micro-LED assembly 410 and grating 420. For example, the light transmitted through consecutive transmitting sections of the grating 420 may extend at an angle within a range of 2° to 5° relative to each other.

Example Double Grating Pixels for 3D Display

FIG. 5 provides an illustration of four pixel assemblies of a double grating display assembly, according to some embodiments of the present disclosure. Each pixel assembly includes a light source 510 or 515 and a double grating 520 or 525. A display assembly includes two types of pixels: right eye pixel and left eye pixels. Both left eye pixels and right eye pixels are distributed across the area of the display. For example, a display assembly may have alternating rows or columns of left eye and right eye pixels, the left eye and right eye pixels may be arranged in a checkerboard pattern, or in another pattern that roughly evenly disperses right eye and left eye pixels. The display assembly includes control circuitry for providing individual images to the left eye pixels and right eye pixels. For example, the display assembly, or a display device that includes the display assembly, may include image processing circuitry for generating separate images for the left eye and right eye, and control circuitry for instructing the left eye pixels and right eye pixels according to the left eye image and right eye image, respectively.

FIG. 5 illustrates two right eye pixels and two left eye pixels. The right eye pixels include a right eye light source 510 and a right eye double grating 520. The left eye pixels include a left eye light source 515 and a left eye double grating 525. The light sources 510 and 515 are similar to the light source 210 described with respect to FIG. 2. The light sources 510 and 515 may each be individually controlled to generate an image, i.e., the light sources 510 (e.g., light source 510a and 510b) are individually controlled to generate an image for the right eye, and the light sources 515 (e.g., light sources 515a and 515b) are individually controlled to generate an image for the left eye.

The pixel assemblies may further include or be used in combination with additional optical elements and/or control elements for generating an image, such as a liquid crystal display (LCD). Each pixel may be configured to generate a range of colors, e.g., each pixel is an RGB pixel. In one example, an LCD assembly for controlling a color emitted by light source 510 and 515 is included between the eye sources and grating assemblies, i.e., right eye LCD pixels are included between the right eye light sources 510 and the right eye double gratings 520, and left eye LCD pixels are included between the left eye light sources 515 and the left eye double gratings 525. Alternatively, an LCD assembly may be included on top of the double grating assemblies 520 and 525, i.e., on the opposite side of the double grating assemblies 520 and 525 from the light sources 510 and 515.

The right eye double gratings 520 each include a first grating 521 and a second grating 522. The first and second right eye gratings 521 and 522 are similar to the first and second gratings 220 and 230 shown in FIG. 2. Each of the first and second right eye gratings 521 and 522 includes alternating light blocking and light transmitting sections, as described with respect to FIG. 2. Similarly, each of the first and second left eye gratings 526 and 527 includes alternating light blocking and light transmitting sections. In this example, the gratings 521, 522, 526, and 527 have a same pitch. Each double grating has a phase shift, i.e., a shift of the second grating 522 or 527 relative to the respective first grating 521 or 526, respectively. The phase shifts are illustrated in FIG. 7. The right eye double grating 520 has a phase shift that is different from the phase shift of the left eye double grating 525. In particular, the difference in phase shift is half or approximately half of the pitch of the gratings, e.g., within 5% or 10% of half of the pitch of the gratings, or within another tolerance.

Each right eye pixel generates a right eye line pattern 530, and each left eye pixel generates a left eye line pattern 535. In particular, a first portion of light emitted from the right eye light source 510 passes through the first right eye grating 521, and a second portion of the light that passed through the first right eye grating 521 passes through the second right eye grating 522, forming the right eye pattern 530. Similarly, a first portion of light emitted from the left eye light source 515 passes through the first left eye grating 526, and a second portion of the light that passed through the first left eye grating 526 passes through the second left eye grating 527, forming the left eye pattern 535. Each of the line patterns 530 and 535 have alternating bright portions and dark portions, as described with respect to FIG. 3 and shown in FIG. 6. The different phase shifts between the right eye double gratings 520 and the left eye double gratings 525 causes the right eye pattern 530 to be different from the left eye pattern 535, and in particular, causes the bright portions and dark portions of the left and right eye patterns 530 and 535 to be offset from each other.

FIG. 6A provides a pair of light intensity fields projected onto two users' eyes of the double grating pixel assemblies of FIG. 5. The users are located along a target plane at a viewing distance D from the pixel assemblies. FIG. 6A shows the left eye pattern 535 generated by the left eye pixels (e.g., the left eye light sources 515 and left eye double gratings 525) and the right eye pattern 530 generated by the right eye pixels (e.g., the right eye light sources 510 and the right eye double gratings 520). FIG. 6A also shows two example viewing positions 610 and 620. FIG. 6A shows only a portion of each light intensity field, e.g., one portion of the right eye pattern 535 illustrated atop a different portion of the left eye pattern 530. It should be understood that the full eye patterns 530 and 535 are overlapping, i.e., each of the right eye pattern 535 and left eye pattern 530 fully cover the faces of the users at the viewing positions 610 and 620.

At the first viewing position 610, the right eye of the viewer is centered at one of the bright portions of the right eye pattern 530, and the right eye is centered at one of the dark portions of the left eye pattern 535. The left eye of the viewer at the first viewing position 610 is centered at one of the bright portions of the left eye pattern 535, and the left eye is centered at one of the dark portions of the right eye pattern 530. This means that only the right eye image is viewable to the viewer's right eye, and only the left eye image is viewable to the viewer's left eye, which allows the viewer to perceive a 3D image. A user can be situated at any position along the target plane where the user's right eye is aligned with a bright portion of the right eye pattern 530, and the user's left eye is aligned with a bright portion of the left eye pattern 535. For example, another user at the second viewing position 620, which is shifted to the right of the first viewing position 610, can also perceive the 3D image.

Along the target plane, the distance between the bright portion of the left eye pattern 535 on a viewer's left eye and the bright portion of the right eye pattern 530 on the viewer's right eye is equal or approximately equal to the distance between the viewer's eyes, e.g., in the range of 50 and 70 mm. As noted with respect to FIG. 3, at planes closer to the display assembly, consecutive bright portions and consecutive dark portions of the eye patterns 530 and 535 are closer together, and at planes farther from the display assembly, consecutive bright portions and consecutive dark portions of the eye patterns 530 and 535 are farther apart. The display assembly can thus accommodate different face shapes at different target planes. For example, if a first user's eyes are slightly farther apart than a second user's, the first user may sit at a viewing distance that is slightly farther away from the display assembly than the second user. This enables both the first user and the second user to perceive the 3D image. For applications where a user's head is at a fixed distance from the display assembly, the target plane may have a distance of about 60 mm between the bright portions of the left and right image patterns. In some applications, the display assembly, user position, or both the display assembly and user position may be able to shift to accommodate different face shapes.

In some applications, a display assembly having the double grating pixels enables users to sit at different depths relative to the display assembly and perceive the 3D image. FIG. 6B shows a user at a third viewing position where the user is located at a viewing distance D/2 from the pixel assemblies, i.e., half of the distance from the pixel assemblies compared to FIG. 6A. In FIG. 6A, the user's right eye was centered on a bright portion of the right eye pattern 530, and the user's left eye was centered on a dark portion of the right eye pattern 530 adjacent to the bright portion on the right eye. Likewise, the user's left eye was centered on a bright portion of the left eye pattern 535, and the user's right eye was centered on a dark portion of the left eye pattern 535 adjacent to the bright portion on the left eye. In FIG. 6B, the user's right eye is centered on a bright portion of the right eye pattern 530, and the user's left eye is centered on a dark portion of the right eye pattern 530 that is separated from the bright portion on the right eye by another dark portion and another bright portion. Likewise, in FIG. 6B, the user's left eye is centered on a bright portion of the left eye pattern 535, and the user's right eye is centered on a dark portion of the left eye pattern 535 that is separated from the bright portion on the left eye by another dark portion and another bright portion. The eye patterns 530 and 535 are periodic with each period including a dark portion and a light portion, so said another way, in FIG. 6A, the user's eyes are separated by one-half of the period of the eye patterns 530 and 535, and in FIG. 6B, the user's eyes are separated by 1.5 times the period of the eye patterns 530 and 535. The user may see the 3D image at other viewing distances, e.g., at target planes a distance D/3, D/4, D/5, etc. from the display.

FIG. 7 illustrates a cross section of the double gratings 520 and 525 shown in FIG. 5, according to some embodiments of the present disclosure. The first right eye grating 521 has a pitch $P_1$, and the second right eye grating has a pitch $P_2$. In the example shown in FIG. 7, the two pitches $P_1$ and $P_2$ are equal. In other embodiments, the pitches $P_1$ and $P_2$ differ within a range of a few percent (e.g., $P_1$ is within 1% of $P_2$, 2% of $P_2$, or 5% of $P_2$). When $P_1$ and $P_2$ are equal, the first and second gratings 521 and 522 are offset by a first phase shift $\varphi_1$. When $P_1$ and $P_2$ are slightly different, $\varphi_1$ can be the phase difference between the central parts of the double grating. In the example shown in FIGS. 5 and 7, the first phase shift $\varphi_1$ is equal to 0, i.e., the first right eye grating 521 and second right eye grating 522 are aligned. In other examples, the right eye gratings 521 and 522 are not aligned, and the first phase shift $\varphi_1$ has another value reflecting their relative positions.

The first left eye grating 526 has a pitch $P_3$, and the second left eye grating has a pitch $P_4$. The two pitches $P_3$ and $P_4$ are equal to each other or they can be slightly different within a range of a few percent. The pitch $P_1$ of the first right eye grating 521 is equal to or approximately equal (e.g., within a few percent) to the pitch $P_3$ of the first left eye grating 526, and the pitch $P_2$ of the second right eye grating 522 is equal to or approximately equal (e.g., within a few percent) to the pitch $P_4$ of the second left eye grating 527. The first and second gratings 526 and 527 are offset by a second phase shift $\varphi_2$. In the example shown in FIGS. 5 and 7, if the period of each of the gratings 521, 522, 526, and 527 is equal to $2\pi$, the second phase shift $\varphi_2$ is equal to $\pi$, i.e., half of the grating pitch $P_1$, $P_2$, $P_3$, and $P_4$. The difference between the first phase shift $\varphi_1$ and the second phase shift $\varphi_2$ is equal to half of the grating pitch $P_1$, $P_2$, $P_3$, and $P_4$, i.e., $\varphi_2-\varphi_1=\pi$. While in FIG. 7, $\varphi_1=0$ and $\varphi_2=\pi$, in other examples, the first and second phase shifts may have any values that maintain the relationship $\varphi_2-\varphi_1=\pi$. In one alternate example, $\varphi_2=3\pi/2$, and $\varphi_1=\pi/2$.

Example Single Grating and Micro-LED Pixels for 3D Display

Figure 8:
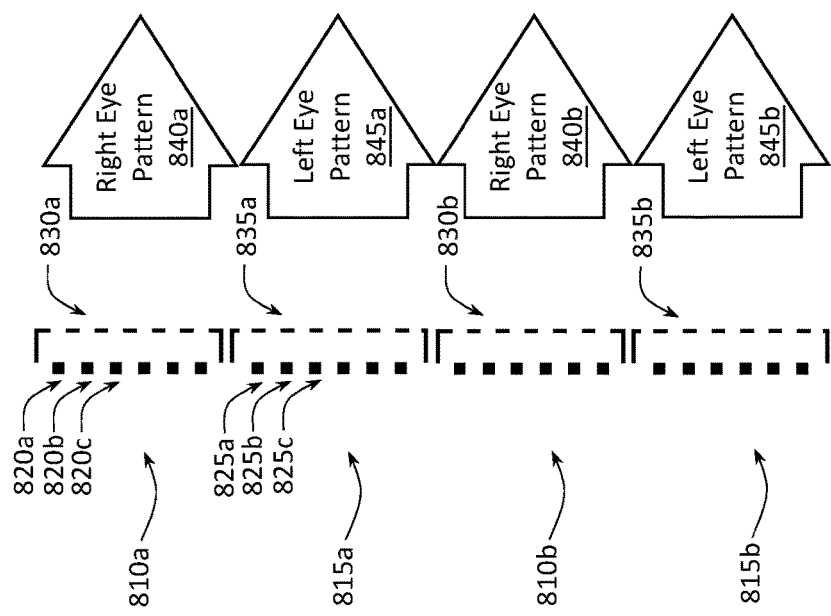
FIG. 8 provides an illustration of four pixel assemblies of a single grating display assembly having micro-LED light sources, according to some embodiments of the present disclosure.

FIG. 8 provides an illustration of four pixel assemblies of a single grating display assembly having micro-LED light sources, according to some embodiments of the present disclosure. Each pixel assembly 810 or 815 includes an array of micro-LEDs 820 or 825 and a grating 830 or 835. A display assembly includes two types of pixels: right eye pixel and left eye pixels. Both left eye pixels and right eye pixels are distributed across the area of a display assembly. For example, a display assembly may have alternating rows or columns of left eye and right eye pixels, the left eye and right eye pixels may be arranged in a checkerboard pattern, or in another pattern that roughly evenly disperses right eye and left eye pixels. The display assembly includes control circuitry for providing individual images to the left eye pixels and right eye pixels. For example, the display assembly, or a display device that includes the display assembly, may include image processing circuitry for generating separate images for the left eye and right eye, and control circuitry for instructing the right eye pixel assemblies 810 and left eye pixel assemblies 815 according to the right eye image and left eye image, respectively.

FIG. 8 illustrates two right eye pixel assemblies 810 and two left eye pixel assemblies 815. The right eye pixel assemblies 810 include a right eye micro-LED array and a right eye grating 830. The left eye pixel assemblies 815 include a left eye micro-LED array and a left eye grating 835. Each micro-LED array and includes a set of micro-LEDs 820 and 825, which are similar to the micro-LEDs 405 described with respect to FIG. 4. For example, a first left eye micro-LED array includes micro-LEDs 820a, 820b, and 820c, and a first right eye micro-LED array includes micro-LEDs 825a, 825b, and 825c. The array of right eye micro-LEDs 820a, 820b, etc. is generally referred as a right eye micro-LED array 820, and the array of left eye micro-LEDs 825a, 825b, etc. is generally referred to as a left eye micro-LED array 825. The micro-LEDs in each array 820 and 825 are spaced at regular intervals; the distance between the center of one micro-LED (e.g., the center of micro-LED 820a) and the center of an adjacent micro-LED (e.g., the center of micro-LED 820b) is referred to as the pitch of the micro-LED array. While each micro-LED array 820 and 825 is depicted as having a row of six micro-LEDs, it should be understood that the micro-LED arrays 820 and 825 may include more or fewer micro-LEDs, and in some embodiments, each pixel includes a single micro-LED. Furthermore, while one row of micro-LEDs per pixel is shown, in some embodiments, the micro-LED arrays may include multiple rows stacked out of or into the page, e.g., each micro-LED array may be a 6×6 matrix of micro-LEDs.

The pixel assemblies 810 and 815 may each be individually controlled to generate an image, i.e., the right eye pixel assemblies 810 (e.g., pixel assembly 810a and pixel assembly 810b) are individually controlled to generate an image for the right eye, and the left eye pixel assemblies 815 (e.g., pixel assembly 815a and pixel assembly 815b) are individually controlled to generate an image for the left eye.

The pixel assemblies 810 and 815 may include one or more additional optical elements and/or control elements for generating an image, such as an LCD. Each pixel may be configured to generate a range of colors, e.g., each micro-LED pixel is an RGB pixel. For example, an LCD assembly may be included on top of the pixel assemblies 830 and 835, i.e., on the opposite side of the gratings 830 and 835 from the LEDs 810 and 815, with right eye LCD pixels on top of the right eye pixel assemblies 810, and left eye LCD pixels on top of the left eye pixel assemblies 815.

Figure 9:
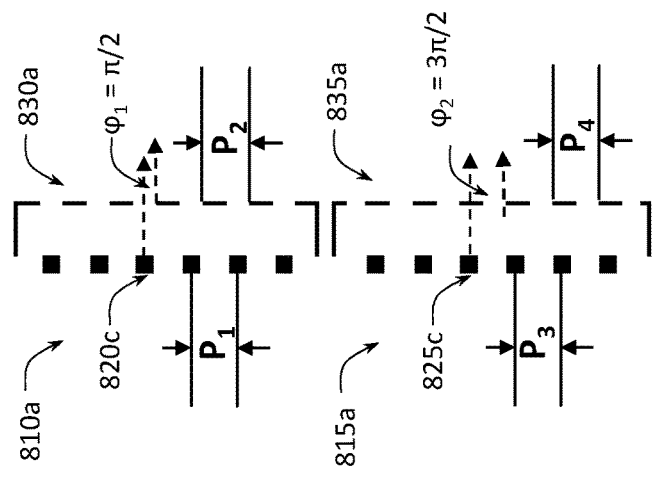
FIG. 9 illustrates a cross section of two of the pixel assemblies shown in FIG. 8, according to some embodiments of the present disclosure.

The right eye gratings 830 and left eye gratings 835 are similar to the grating 420 shown in FIG. 4. Each of the right eye gratings 830 includes alternating light blocking and light transmitting sections, as described with respect to FIG. 4. Similarly, each of the left eye gratings 835 includes alternating light blocking and light transmitting sections. In this example, the gratings 830 and 835 have the same pitch, which matches a pitch of the micro-LED arrays 820 and 825. In other embodiments, the gratings 830 and 835 have a different pitch from the micro-LED arrays 820 and 825. In particular, the micro-LED arrays may have any pitch that is a whole number multiple of the gratings (e.g., the grating pitch is one times, two times, or three times the micro-LED pitch), or approximately a whole number multiple of the gratings (e.g., within 1%, 2%, or 5% of a whole number multiple of the gratings). Each grating 830 and 835 has a phase shift relative to its respective micro-LED array 820 or 825. The phase shifts are illustrated in FIG. 9. The right eye pixel has a phase shift that is different from the phase shift of the left eye pixel. In particular, the difference in phase shift is half or approximately half of the pitch of the gratings and the micro-LED arrays, e.g., within 5% or 10% of half of the pitch of the gratings and the micro-LED arrays, or within another tolerance.

Each right eye pixel generates a right eye line pattern 840, and each left eye pixel generates a left eye line pattern 845. In particular, a portion of light emitted from the right eye micro-LED array 820 passes through the right eye grating 830, forming the right eye line pattern 840. Similarly, a portion of light emitted from the left eye micro-LED array 825 passes through the left eye grating 835, forming the left eye line pattern 845. Each of the line patterns 840 and 845 have alternating bright portions and dark portions, as described with respect to FIGS. 3, 6A, and 6B. The different phase shifts between the right eye pixels and the left eye pixels causes the right eye line pattern 840 to be different from the left eye line pattern 845, and in particular, so that the bright portions and dark portions of the left and right eye line patterns 840 and 845 are offset from each other. The light intensity fields formed by the micro-LED and single grating assemblies shown in FIG. 8 may be the same as the light intensity fields shown in FIGS. 6A and 6B. Further, the properties of the line patterns 840 and 845 are similar to the properties of the line patterns 530 and 535 described with respect to FIGS. 6A and 6B.

FIG. 9 illustrates a cross section of two pixel assemblies 810 and 815 shown in FIG. 8, according to some embodiments of the present disclosure. The right eye micro-LEDs 820 are arranged at a pitch $P_1$, and the right eye grating 830 has a pitch $P_2$ between the edge of one light blocking section and the edge of an adjacent light blocking section. The two pitches $P_1$ and $P_2$ are equal or they can be different within a range of a few percent, e.g., within 5% of each other. The centers of the micro-LEDs 820 are offset from the centers of the transmitting portions of the right eye grating 830 by a first phase shift $\varphi_1$. The first phase shift $\varphi_1$ shown in FIG. 9 shows the distance from the center of the micro-LED 820c to the center of one of the grating openings. In the example shown in FIGS. 8 and 9, if the period of the micro-LEDs 820 and right eye grating 830 is $2\pi$, the first phase shift $\varphi_1$ is equal to $\pi/2$, i.e., the centers of the micro-LEDs 820 are aligned with the light transmitting sections of the grating 830, and the centers of the micro-LEDs 820 are offset from the edge of the light blocking sections of the grating 830 by a quarter-period. In other examples, the centers of the micro-LEDs 820 not are aligned with the light transmitting sections of the grating 830, and the first phase shift $\varphi_1$ has another value reflecting their relative positions.

The left eye micro-LEDs 825 are arranged at a pitch $P_3$, and the left eye grating has a pitch $P_4$ between the edge of one light blocking section and the edge of an adjacent light blocking section. The two pitches $P_3$ and $P_4$ are equal to each other or they can be different within a range of a few percent. The pitches $P_1$ and $P_2$ of the right pixel assembly 810 are equal to pitches $P_3$ and $P_4$, respectively. The centers of the micro-LEDs 825 are offset from the centers of the transmitting portions of the left eye grating 835 by a second phase shift $\varphi_2$. In the example shown in FIGS. 8 and 9, if the period of the micro-LEDs 825 and left eye grating 835 is $2\pi$, the second phase shift $\varphi_2$ is equal to $3\pi/2$. The difference between the first phase shift $\varphi_1$ and the second phase shift $\varphi_2$ is equal to half of the pitches $P_1$, $P_2$, $P_3$, and $P_4$, i.e., $\varphi_2-\varphi_1=\pi$. While in FIG. 9, $\varphi_1=\pi/2$ and $\varphi_2=3\pi/2$, in other examples, the first and second phase shifts may have any values that maintain the relationship $\varphi_2-\varphi_1=\pi$. In one alternate example, $\varphi_2=\pi$, and $\varphi_1=0$.

Example Pixel Assembly for Left Eye and Right Eye Images

Figure 10:
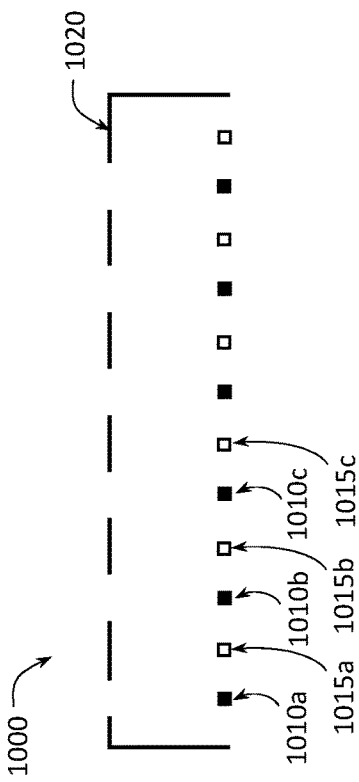
FIG. 10 provides an illustration of an example pixel for generating both left eye and right eye images according to some embodiments of the present disclosure.

While FIGS. 8 and 9 include separate pixels for the left eye and right eye line patterns 840 and 845, in some embodiments, the micro-LEDs for the left eye images and right eye images are combined in a single pixel. FIG. 10 provides an illustration of an example pixel assembly 1000 for generating both left eye and right eye images according to some embodiments of the present disclosure. A display assembly may be formed by distributing a set similar or identical ones of the pixel assembly 1000 shown in FIG. 10 across the area of the display. The pixel assembly 1000 includes a set of right eye micro-LEDs 1010, a set of left eye micro-LEDs 1015, and a grating 1020. The display assembly includes control circuitry for providing individual images to the right eye micro-LEDs and left eye micro-LEDs. For example, the display assembly, or a display device that includes the display assembly, may include image processing circuitry for generating separate images for the right eye and left eye, and control circuitry for instructing the right eye micro-LEDs 1010 and left eye micro-LEDs 1015 according to the right eye image and left eye image, respectively.

The right eye micro-LEDs 1010 are similar to the micro-LEDs 405 described with respect to FIG. 4, and the right eye micro-LED array 820 described with respect to FIGS. 8 and 9. The right eye micro-LEDs 1010 (e.g., right eye micro-LEDs 1010a, 1010b, and 1010c) are spaced at regular intervals; the distance between the center of one right eye micro-LED 1010 (e.g., the center of micro-LED 1010a) and the center of an adjacent right eye micro-LED (e.g., the center of micro-LED 1010b) is referred to as the pitch of the right eye micro-LEDs. The left eye micro-LEDs 1015 (e.g., left eye micro-LEDs 1015a, 1015b, and 1015c) are similarly spaced at regular intervals; the distance between the center of one left eye micro-LED 1015 (e.g., the center of micro-LED 1015a) and the center of an adjacent left eye micro-LED (e.g., the center of micro-LED 1015b) is referred to as the pitch of the left eye micro-LEDs. The pitches of the right eye micro-LEDs 1010 and left eye micro-LEDs 1015 are equal. The right eye micro-LEDs 1010 and left eye micro-LEDs 1015 are separately controlled to generate an image, i.e., the right eye micro-LEDs 1010 are controlled at a per-pixel level to generate an image for the right eye, and the left eye micro-LEDs 1015 are controlled at a per-pixel level to generate an image for the left eye.

While the pixel assembly 1000 is depicted as having six right eye micro-LEDs 1010 and six left eye micro-LEDs 1015, it should be understood that more or fewer right eye and left eye micro-LEDs may be included, and in some embodiments, each pixel includes a single right eye micro-LED 1010 and left eye micro-LED 1015. While one row of micro-LEDs 1010 and 1015 is shown, in some embodiments, the pixel assembly 1000 may include multiple rows of micro-LEDs stacked out of or into the page, e.g., each pixel assembly may include a 12×12 matrix of micro-LEDs, half for the left eye image and half for the right eye image. Furthermore, while the right eye micro-LEDs 1010 and left eye micro-LEDs 1015 are depicted as being in the same row, in some embodiments, the right eye micro-LEDs 1010 are in one or more rows that are offset from one or more rows of left eye micro-LEDs 1015. This may improve manufacturing and control of the micro-LEDs, as each row in a given pixel may be individually controlled.

The grating 1020 is similar to the grating 420 shown in FIG. 4, and to the gratings 830 and 835 shown in FIGS. 8 and 9. The grating 1020 includes alternating light blocking and light transmitting sections, as described with respect to FIG. 4. In this example, the grating 1020 has a pitch that matches the pitch of the right eye micro-LEDs 1010 and the pitch of the pitch of the left eye micro-LEDs 1015. As noted with respect to FIG. 8, in other embodiments, the pitch of the micro-LEDs may be a whole number multiple of the pitch of the grating 1020, or approximately a whole number multiple of the pitch of the grating 1020. The right eye micro-LEDs 1010 and left eye micro-LEDs 1015 each have a different phase shift, or phase position, relative to the grating 1020. In this example, the right eye micro-LEDs 1010 have a first phase shift relative to the grating 1020 that is equal to π/2 (as shown in FIG. 9), and, the left eye micro-LEDs 1015 have a second phase shift relative to the grating 1020 that is equal to 3π/2 (as shown in FIG. 9). While the first and second phase shifts may be different in different embodiments, the difference between the first and second phase shift is half or approximately half of the pitch of the grating 1020, e.g., within 5% or 10% of half of the pitch of the grating 1020, or within another tolerance.

The pixel assembly 1000 generates both a right eye line pattern and a left eye line pattern. In particular, a portion of light emitted from the right eye micro-LEDs 1010 passes through the grating 1020, forming the right eye pattern, and a portion of light emitted from the left eye micro-LEDs 1015 passes through the grating 1020, forming the left eye pattern. Each of the line patterns have alternating bright portions and dark portions, as described with respect to FIGS. 3, 6A, and 6B. The different positions of the right eye micro-LEDs 1010 and left eye micro-LEDs 1015 causes the right eye pattern to be different from the left eye pattern, and in particular, so that the bright portions and dark portions of the left and right eye patterns and are offset from each other. The light intensity fields formed by the pixel assembly 1000 may be the same as the light intensity fields shown in FIGS. 6A and 6B. Further, the properties of the line patterns are similar to the properties of the line patterns 530 and 535 described with respect to FIGS. 6A and 6B.

Example Display Assembly with Varied Grating Phase Shifts

Figure 11:
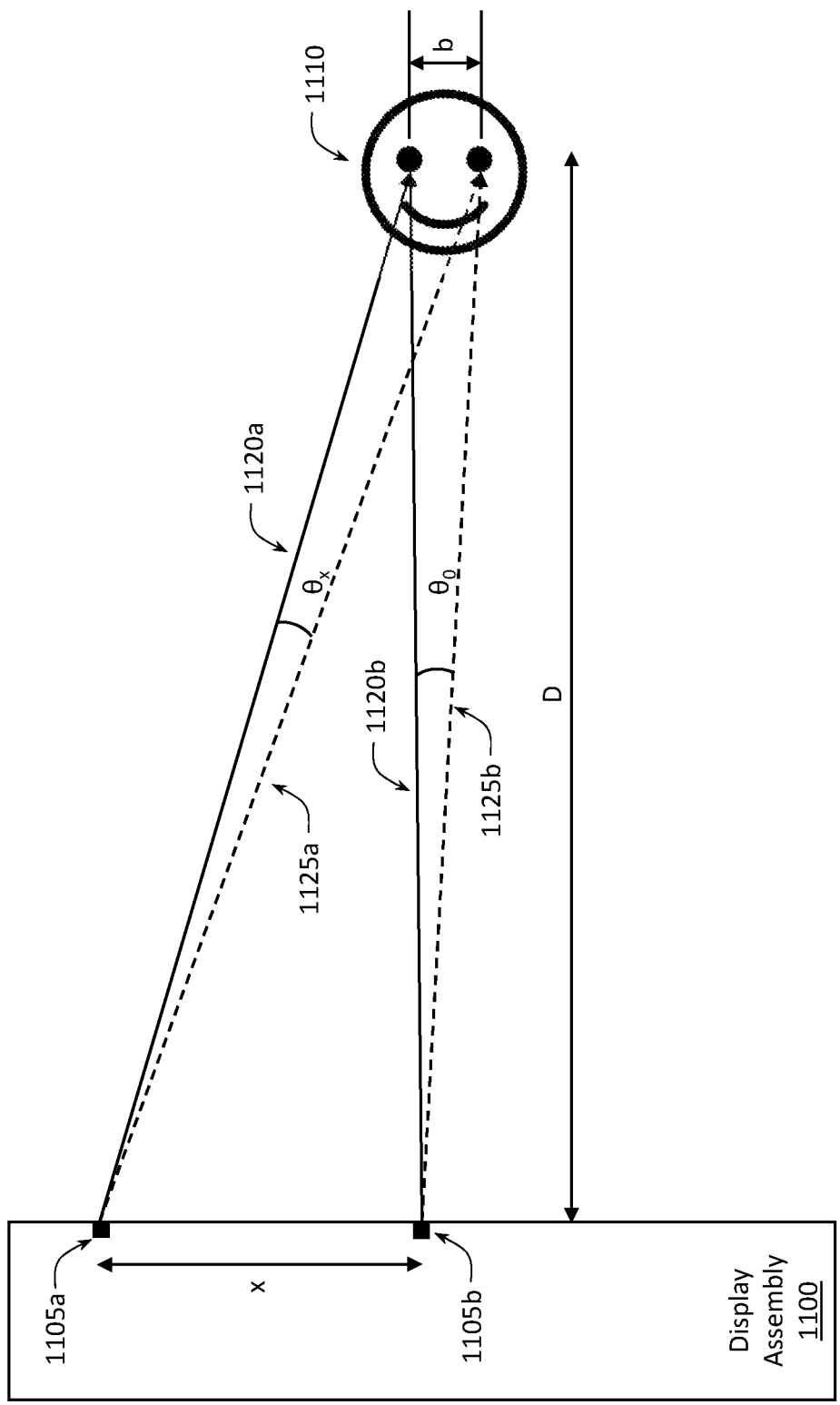
FIG. 11 provides example of a display assembly generating left and right image patterns viewed at a viewing position near the center of the display, according to some embodiments of the present disclosure.

FIG. 11 provides example of a display assembly 1100 generating left and right image patterns viewed at a viewing position near the center of the display, according to some embodiments of the present disclosure. The display assembly 1100 includes a set of pixels assemblies 1105. Two example pairs of pixels 1105a and 1105b are shown. Each pixel pair 1105 include a right eye pixel assembly, e.g., one of the right eye pixel assemblies shown in FIG. 5 or 8, and a left eye pixel assembly, e.g., one of the left eye pixel assemblies shown in FIG. 5 or 8. Alternatively, rather than including pixel pairs, the display assembly 1100 may include pixels that generate both left eye and right eye line patterns, e.g., the pixel assembly shown in FIG. 10. The pixel pair 1105b is located along a center axis of the display assembly 1100. The pixel pair 1105a is located a distance x from the pixel pair 1105b, and the distance x from the center axis of the display assembly 1100.

A viewer 1110 is located a distance D away from the display assembly. Four example light rays emitted by the pixels 1105 and viewed by the viewer 1110 are depicted. The first pixel pair 1105a emits a right eye line pattern that includes right eye light ray 1120a and a left eye line pattern that includes a left eye light ray 1125a. The second pixel pair 1105b emits a right eye line pattern that includes right eye light ray 1120b and a left eye line pattern that includes a left eye light ray 1125b. The light rays 1120a, 1120b, 1125a, and 1125b each represent a bright portion of the left eye line pattern or right eye line pattern, e.g., a maxima of the left eye line pattern or right eye line pattern. The right eye light rays 1120 reach the right eye of the viewer 1110, and the left eye light rays 1125 reach the left eye of the viewer 1110.

To ensure that the line patterns generated by pixels across the full width of the display assembly 1100 are viewable by the viewer 1110, the pixel assemblies can incorporate an x-dependent phase shift in their gratings. In particular, moving across the width of the display assembly 1100, the second gratings 522 and 527 on the pixel assemblies shown in FIG. 5 can be shifted relative to the first gratings 521 and 526, or the gratings 830 and 835 shown in FIG. 8 or the grating 1020 shown in FIG. 10 can be shifted relative to the micro-LEDs. As noted above, the gratings are periodic structures, and the double grating relative positions, or grating to micro-LED relative position, can be described by a phase shift of Δφ, where the Δφ=π and 2π represents a relative shift on gratings equal to half a pitch, P/2, and one pitch size, P, respectively. For the display assembly 1100, in addition to the relative phases of the left eye and right eye pixels described above, a further phase shift of $$\Delta\varphi(x) = \frac{2\pi dx}{P\sqrt{n^2 D^2 - x^2(n^2 - 1)}}$$

on the second grating (for the double grating embodiment) or grating (for the micro-LED embodiments) of the pixels 1105a located at distance x away from the center axis of the display assembly 1100 match the right eye and left eye light rays 1120a and 1125b to their proper positions on the eyes of the viewer 1110. In this equation, d is the thickness of double grating or the distance between the single grating and the micro-LEDs, and n is the refractive index of the material between the double grating or the material separating the micro-LEDs from the single grating. If the gap between the double gratings or between the micro-LEDs and single grating is filled with air, then n=1 and the phase shift is $$\Delta\varphi(x) = \frac{2\pi dx}{PD}.$$

Example Display System

Figure 12:
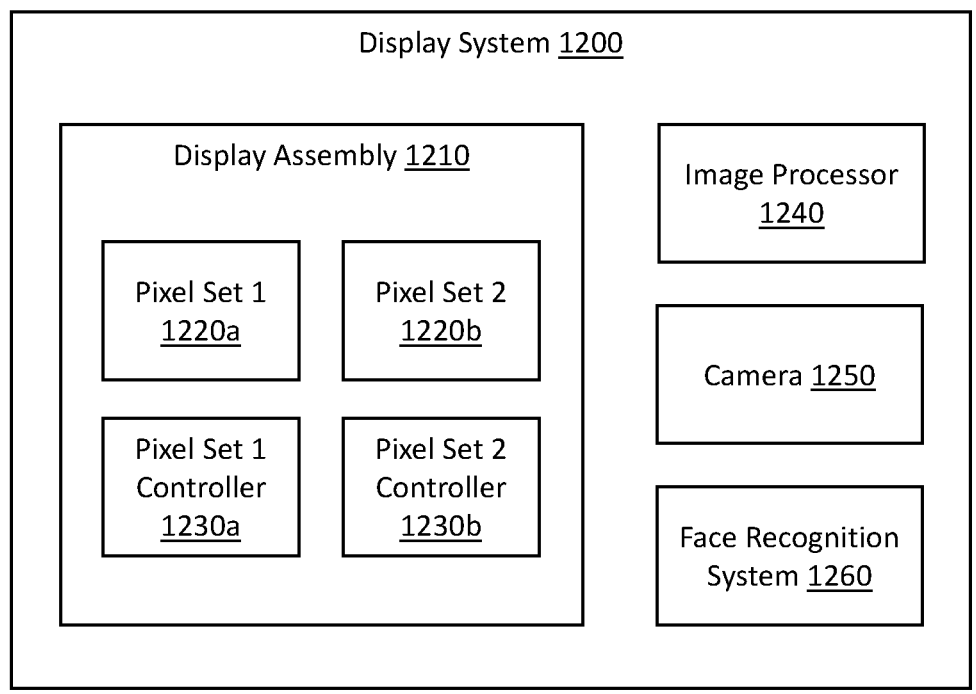
FIG. 12 is a block diagram of a display system that includes any of the display assemblies described herein.

FIG. 12 is a block diagram of an example display system incorporating any of the display assemblies described above. The display system 1200 includes a display assembly 1210, an image processor 1240, a camera 1250, and a face recognition system 1260. The display assembly 1210 includes two sets of pixels, pixel set 1 1220a and pixel set 2 1220b, and two pixel controllers, pixel set 1 controller 1230a and pixel set 2 controller 1230b. Each of the pixel sets 1220a and 1220b has a respective line pattern formed by a grating or double grating, e.g., the line patterns shown in FIGS. 6A and 6B. In one example, the pixel set 1 1220a is a set of right eye pixels, e.g., the right eye pixel assemblies shown in FIG. 5 or 8, and the pixel set 2 1220b is a set of left eye pixels, e.g., the left eye pixel assemblies shown in FIG. 5 or 8. Alternatively, the display system 1200 may include a single set of pixels that generate both left eye and right eye line patterns, e.g., the pixel assembly shown in FIG. 10 includes both pixel set 1 1220a and pixel set 2 1220b. In this example, one portion of the micro-LEDs (e.g., the micro-LEDs 1010) and the grating 1020 may be considered pixel set 1 1220a, and the other portion of the micro-LEDs (e.g., the micro-LEDs 1015) and the grating 1020 may be considered pixel set 2 1220b. Pixel set 1 1220a and pixel set 2 1220b are distributed across the area of the display assembly. For example, the pixels in set 1 1220a and the pixels in set 2 1220b may be arranged in alternating rows or columns, the pixels in set 1 1220a and set 2 1220b may be arranged in a checkerboard pattern, or the pixels may be distributed in another pattern that roughly evenly disperses the two sets.

The pixel set 1 controller 1230a includes control circuitry for providing images to the pixels in pixel set 1 1220a. The pixel set 1 controller 1230a receive images data from the image processor 1240 and instructs the pixels in pixel set 1 1220a to generate the image. For example, the pixel set 1 controller 1230a may set a voltage or current of each of the pixels in pixel set 1 1220a to generate the specified image. In some embodiments, the pixel set 1 controller 1230a, or a separate pixel set 1 LCD controller, controls a respective set of LCD pixels to set colors for each of the pixels in pixel set 1 1220a. Likewise, the pixel set 2 controller 1230b includes control circuitry for providing images to the pixels in pixel set 2 1220b. The pixel set 2 controller 1230b receives image data from the image processor 1240 and instructs the pixels in pixel set 2 1220b to generate the image. For example, the pixel set 2 controller 1230b may set a voltage or current of each of the pixels in pixel set 2 1220b to generate the specified image. In some embodiments, the pixel set 2 controller 1230b, or a separate pixel set 2 LCD controller, controls a respective set of LCD pixels to set colors for each of the pixels in pixel set 2 1220b.

The image processor 1240 generates separate images for the left eye and the right eye and provides the left eye and right eye images to the pixel set 1 controller 1230a and 1230b. In some embodiments, the image processor 1240 may alternately assign the two pixel sets 1220a and 1220b and controllers 1230a and 1230b to the left eye and right eye images, i.e., assigning pixel set 1 1220a and pixel set 1 controller 1230a to the right eye and assigning pixel set 2 1220b and pixel set 2 controller 1230b to the left eye at a first time, and assigning pixel set 1 1220a and pixel set 1 controller 1230a to the left eye and assigning pixel set 2 1220b and pixel set 2 controller 1230b to the right eye at a second time. Returning to FIG. 6A, if the first viewing position 610 is shifted by half a period in the line patterns 530 and 535, a maxima of the right eye pattern 530 is aligned with the viewer's left eye, and a maxima of the left eye pattern 535 is aligned with the viewer's right eye. In this situation, the image processor 1240 can swap the images provided to the two pixel controllers 1230a and 1230b, i.e., providing the "left" image to the "right" pixels, and providing the "right" image to the "left" pixels. This enables the viewing user to correctly perceive the three-dimensional image in a greater number of positions.

To determine which image should be provided to which set of pixel controllers 1230a and 1230b (and accordingly, which image is displayed by which set of pixels 1220a and 1220b), a camera 1250 obtains images of a viewer of the display system 1200. A face recognition system 1260 receives an image from the camera 1250 and processes the image to locate the viewer's face. In particular, the face recognition system 1260 determines the position of at least one of the viewer's eyes relative to the display assembly 1210. The face recognition system 1260 may determine an angular distance between the viewer's eyes and a lateral position of one or both of the viewer's eyes, e.g., relative to a central vertical axis of the display assembly 1210. The face recognition system 1260 compares the position of at least one of the viewer's eyes to the respective line patterns (e.g., the line patterns 530 and 535) projected from the display assembly 1210 to determine which set of pixels best aligns with each eye. The face recognition system 1260 instructs the image processor 1240 which set of pixels 1220 to provide the right eye image, and which set of pixels 1220 to provide the left eye image.

In one example, the face recognition system 1260 determines a position of a single eye (e.g., the user's left eye) relative to one of the line patterns (e.g., the line pattern 530) and sets the right eye image and left eye image accordingly. If the user's left eye falls within a bright portion of the line pattern 530, the face recognition system 1260 assigns the left eye image to the set of pixels that generate the line pattern 530, and assigns the right eye image to the set of pixels that generate the line pattern 535. Alternatively, if the user's left eye falls within a dark portion of the line pattern 530, the face recognition system 1260 assigns the right eye image to the set of pixels that generate the line pattern 530, and assigns the left eye image to the set of pixels that generate the line pattern 535.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

In some embodiments, any number of electrical circuits of the accompanying drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer readable storage medium comprising instructions to allow a processor to carry out those functionalities.

In some embodiments, the electrical circuits of the accompanying drawings may be implemented as stand-alone modules (e.g., a device with associated components and circuitry configured to perform a specific application or function) or implemented as plug-in modules into application specific hardware of electronic devices. Note that some embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the near field line pattern generator may be implemented in one or more silicon cores in Application Specific Integrated Circuits (ASICs), Field Programmable Gate Arrays (FPGAs), and other semiconductor chips.

It is also important to note that the functions related to the display assemblies described herein illustrate only some of the possible functions that may be executed by, or within, a display device. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

The invention claimed is:

1. A display assembly comprising:
a first plurality of pixels to generate a first image pattern for a left eye of a user, each of the first plurality of pixels comprising:
a first left eye grating comprising alternating light blocking sections and light transmitting sections;
a second left eye grating comprising alternating light blocking sections and light transmitting sections, the second left eye grating having a first phase shift relative to the first left eye grating; and
a left eye light source to emit light directed at the first left eye grating and the second left eye grating to generate the first image pattern; and
a second plurality of pixels to generate a second image pattern for a right eye of the user, each of the second plurality of pixels comprising:
a first right eye grating comprising alternating light blocking sections and light transmitting sections;
a second right eye grating comprising alternating light blocking sections and light transmitting sections, the second right eye grating having a second phase shift relative to the first right eye grating, the second phase shift different from the first phase shift; and
a right eye light source to emit light directed at the first right eye grating and the second right eye grating to generate the second image pattern.

2. The display assembly of claim 1, wherein the first image pattern has alternating first bright portions and first dark portions, the second image pattern has alternating second bright portions and second dark portions, and the first bright portions of the first image pattern are offset from the second bright portions of the second image pattern at a viewing distance from the display assembly.

3. The display assembly of claim 2, wherein the offset between in the first and second bright portions of the first and second image patterns is in a range of 50 mm to 70 mm at the viewing distance from the display assembly.

4. The display assembly of claim 1, wherein the left eye gratings and the right eye gratings have a pitch, and the difference between the first phase shift and the second phase shift is approximately half of the pitch.

5. The display assembly of claim 1, wherein a first pair of pixels comprising one of the first plurality of pixels and one of the second plurality of pixels are arranged along a center of the display assembly, a second pair of pixels comprising a second one of the first plurality of pixels and a second one of the second plurality of pixels are offset from the center of the display assembly, the second right eye grating and the second left eye grating of the first pair of pixels each having a phase shift relative to the second right eye grating and the second left eye grating of the second pair of pixels.

6. The display assembly of claim 1, wherein:
the left eye light source is positioned that a first portion of the emitted light from the left eye light source passes through the first left eye grating, and a second portion of the light passed through the first left eye grating passes through the second left eye grating, the second portion of the light passed through the second left eye grating forming the first image pattern; and
the right eye light source is positioned that a first portion of the emitted light from the right eye light source passes through the first right eye grating, and a second portion of the light passed through the first right eye grating passes through the second right eye grating, the second portion of the light passed through the second right eye grating forming the second image pattern.

7. A display assembly comprising:
a first plurality of pixels to generate a first image pattern for a left eye of a user, each of the first plurality of pixels comprising:
a left eye grating extending in a lateral direction, having a left eye grating pitch, and comprising alternating light blocking sections and light transmitting sections; and
a plurality of left eye micro-LEDs positioned to emit light directed at the left eye grating to generate the first image pattern, the plurality of left eye micro-LEDs having a first pitch that is within 2% of a whole number multiple of the left eye grating pitch, the plurality of left eye micro-LEDs being laterally offset from respective centers of the light transmitting sections of the left eye grating by a first lateral offset value; and
a second plurality of pixels to generate a second image pattern for a right eye of the user, each of the second plurality of pixels comprising:
a right eye grating extending in the lateral direction, having a right eye grating pitch, and comprising alternating light blocking sections and light transmitting sections; and
a plurality of right eye micro-LEDs positioned to emit light directed at the right eye grating to generate the second image pattern, the plurality of right eye micro-LEDs having a second pitch that is within 2% of a whole number multiple of the right eye grating pitch, the plurality of right eye micro-LEDs being laterally offset from respective centers of the light transmitting sections of the right eye grating by a second lateral offset value that differs from the first lateral offset value.

8. The display assembly of claim 7, wherein the first pitch and the second pitch are within 2% of each other.

9. The display assembly of claim 7, wherein the left eye grating pitch equals the right eye grating pitch, and the first lateral offset value and the second lateral offset value differ by approximately half of the left eye grating pitch.

10. The display assembly of claim 7, wherein a first pair of pixels comprising one of the first plurality of pixels and one of the second plurality of pixels are arranged along a center of the display assembly, and a second pair of pixels comprising a second one of the first plurality of pixels and a second one of the second plurality of pixels are offset from the center of the display assembly, the gratings of the first pair of pixels each having a phase shift relative to the gratings of the second pair of pixels.

11. The display assembly of claim 7, wherein the first image pattern has alternating first bright portions and first dark portions, the second image pattern has alternating second bright portions and second dark portions, and the first bright portions of the first image pattern are offset from the second bright portions of the second image pattern at a viewing distance from the display assembly.

12. The display assembly of claim 11, wherein the offset between in the first and second bright portions of the first and second image patterns is in a range of 50 mm to 70 mm at the viewing distance from the display assembly.

13. The display assembly of claim 7, wherein:
the plurality of left eye micro-LEDs is positioned such that a portion of the emitted light from the plurality of left eye micro-LEDs passes through the left eye grating, the portion of the light passed through the left eye grating forming the first image pattern; and
the plurality of right eye micro-LEDs is positioned that a portion of the emitted light from the plurality of right eye micro-LEDs passes through the right eye grating, the portion of the light passed through the right eye grating forming the second image pattern.

14. A display assembly comprising a plurality of pixels, each pixel comprising:
a grating extending in a lateral direction, having a grating pitch, and comprising alternating light blocking sections and light transmitting sections;
a plurality of first micro light emitting diodes (micro-LEDs) arranged to emit light directed at the grating to generate a first image pattern, the plurality of first micro-LEDs arranged at a first pitch that is within 2% of a whole number multiple of the grating pitch, the plurality of first micro-LEDs having a first lateral position relative to the light transmitting sections of the grating; and
a plurality of second micro-LEDs arranged to emit light directed at the grating to generate a second image pattern, the plurality of second micro-LEDs arranged at a second pitch that is within 2% of a whole number multiple of the grating pitch, the plurality of second micro-LEDs having a second lateral position relative to the light transmitting sections of the grating, the second lateral position being laterally offset from the first lateral position.

15. The display assembly of claim 14, wherein the first lateral position is laterally offset from the second lateral position by approximately half of the grating pitch.

16. The display assembly of claim 14, wherein the plurality of first micro-LEDs is configured to receive first image data corresponding to a left eye of a user, and the plurality of second micro-LEDs is configured to receive second image data corresponding to a right eye of the user.

17. The display assembly of claim 14, wherein the first image pattern has alternating first bright portions and first dark portions, the second image pattern has alternating second bright portions and second dark portions, and the first bright portions of the first image pattern are offset from the second bright portions of the second image pattern at a viewing distance from the display assembly.

18. The display assembly of claim 17, wherein the offset between in the first and second bright portions of the first and second image patterns is in a range of 50 mm to 70 mm at the viewing distance from the display assembly.

* * * * *